US012730050B2

(12) United States Patent
Kasai et al.

(10) Patent No.: US 12,730,050 B2
(45) Date of Patent: Sep. 8, 2026

(54) LIQUID VISCOSITY MEASUREMENT DEVICE AND LIQUID VISCOSITY MEASUREMENT METHOD

(71) Applicant: CANON KABUSHIKI KAISHA, Tokyo (JP)

(72) Inventors: Shintaro Kasai, Kanagawa (JP); Shinichi Sakurada, Tokyo (JP); Futoshi Hirose, Kanagawa (JP); Takeshi Okada, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 336 days.

(21) Appl. No.: 18/475,579

(22) Filed: Sep. 27, 2023

(65) Prior Publication Data

US 2024/0027318 A1 Jan. 25, 2024

Related U.S. Application Data

(63) Continuation of application No. PCT/JP2022/001651, filed on Jan. 18, 2022.

(30) Foreign Application Priority Data

Apr. 22, 2021 (JP) ................................ 2021-072425

(51) Int. Cl.
*G01N 11/00* (2006.01)

(52) U.S. Cl.
CPC ...... *G01N 11/00* (2013.01); *G01N 2011/0093* (2013.01)

(58) Field of Classification Search
CPC ........... G01N 11/00; G01N 2011/0093; G01N 25/10; G01N 37/00; B41J 2/01
See application file for complete search history.

(56) References Cited

U.S. PATENT DOCUMENTS

2011/0259090 A1 10/2011 Angelescu et al.
2021/0129041 A1* 5/2021 Imanaka .................. B01B 1/00

FOREIGN PATENT DOCUMENTS

CN 109945681 A * 6/2019
JP 61-54427 A 3/1986
JP H04231966 A * 8/1992
JP 9-201967 A 8/1997

(Continued)

OTHER PUBLICATIONS

Miguet, Jonas, Florence Rouyer, and Emmanuelle Rio. "The life of a surface bubble." Molecules 26.5 (2021): 1317 (Year: 2021).*

(Continued)

*Primary Examiner* — Fatemeh Esfandiari Nia
(74) *Attorney, Agent, or Firm* — Venable LLP

(57) ABSTRACT

A liquid viscosity measurement device for measuring a viscosity of a liquid includes: a substrate; a channel configured to be installed on the substrate so that the liquid flows through the channel; a heating element configured to generate a bubble in the liquid inside the channel; a sensor configured to be placed in a vicinity of the heating element so as to measure a temperature; and a deriving unit configured to derive the viscosity of the liquid by specifying a bubble disappearance time period from generation to disappearance of the bubble based on a change in temperature obtained by use of the sensor, so that the viscosity of the liquid is derived based on the bubble disappearance time period.

16 Claims, 14 Drawing Sheets

(56) References Cited

FOREIGN PATENT DOCUMENTS

| | | | |
|---|---|---|---|
| JP | 2682993 | B2 * | 11/1997 |
| JP | 2007-17207 | A | 1/2007 |
| WO | 2022/224510 | A1 | 10/2022 |

OTHER PUBLICATIONS

JP-2682993-B2 (Year: 1997).*
CN-109945681-A (Year: 2017).*
JP-H04231966-A (Year: 1992).*
International Search Report in International Patent Application No. PCT/JP2022/001651 (Apr. 2022).

* cited by examiner

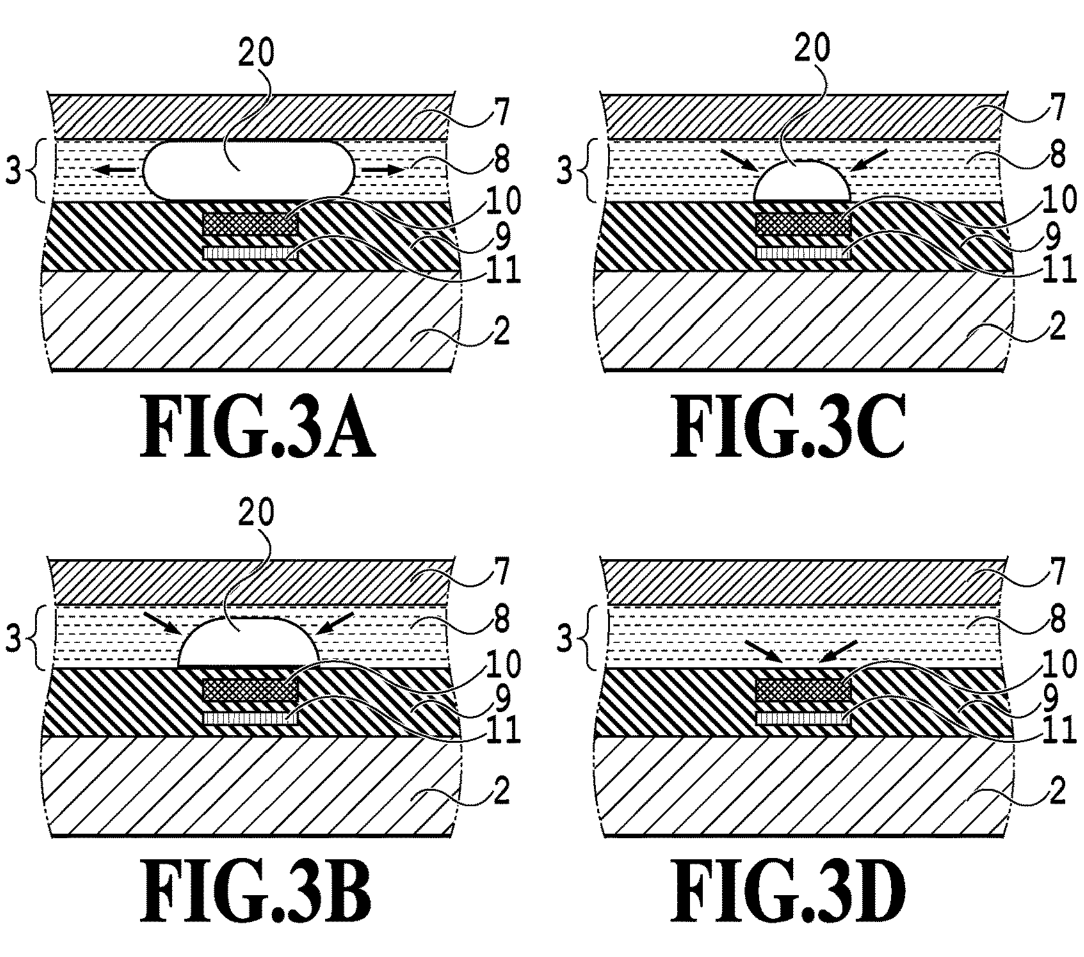
FIG.3A
FIG.3C
FIG.3B
FIG.3D
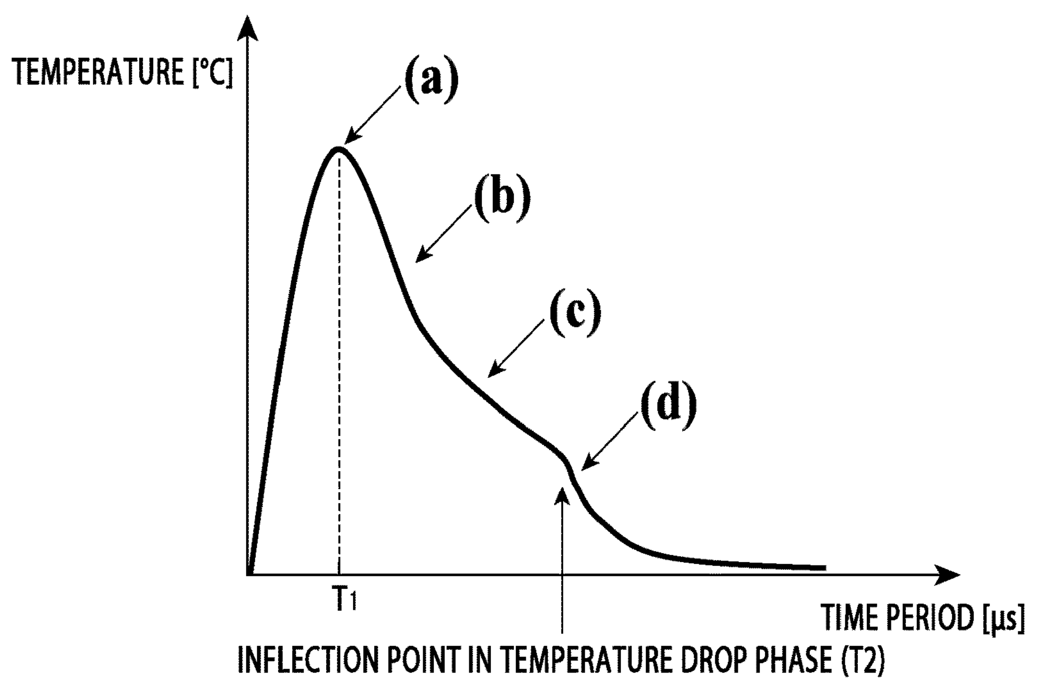
FIG.3E 20
7
3
8
10
9
11
2
FIG.6A
20
7
3
8
10
9
11
2
FIG.6C
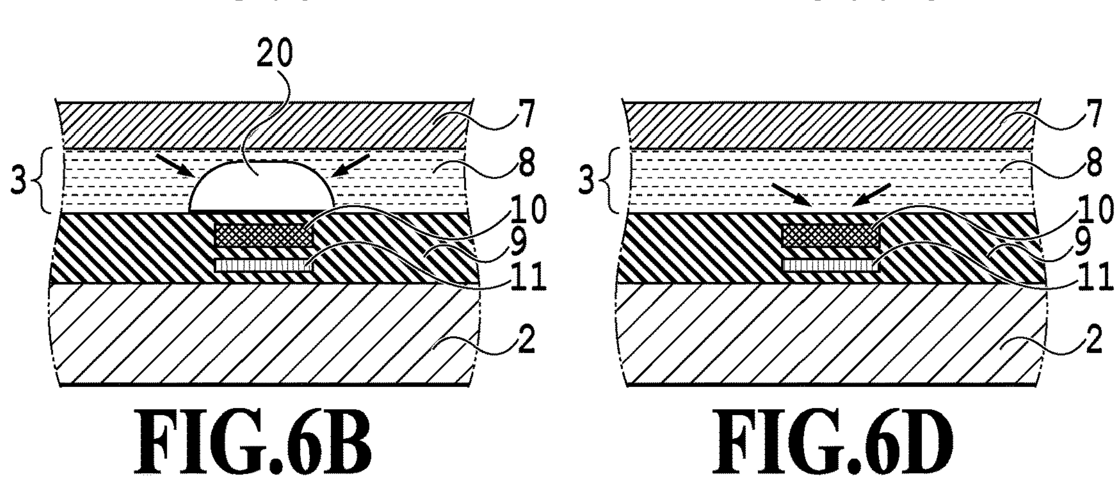
FIG.6B
FIG.6D
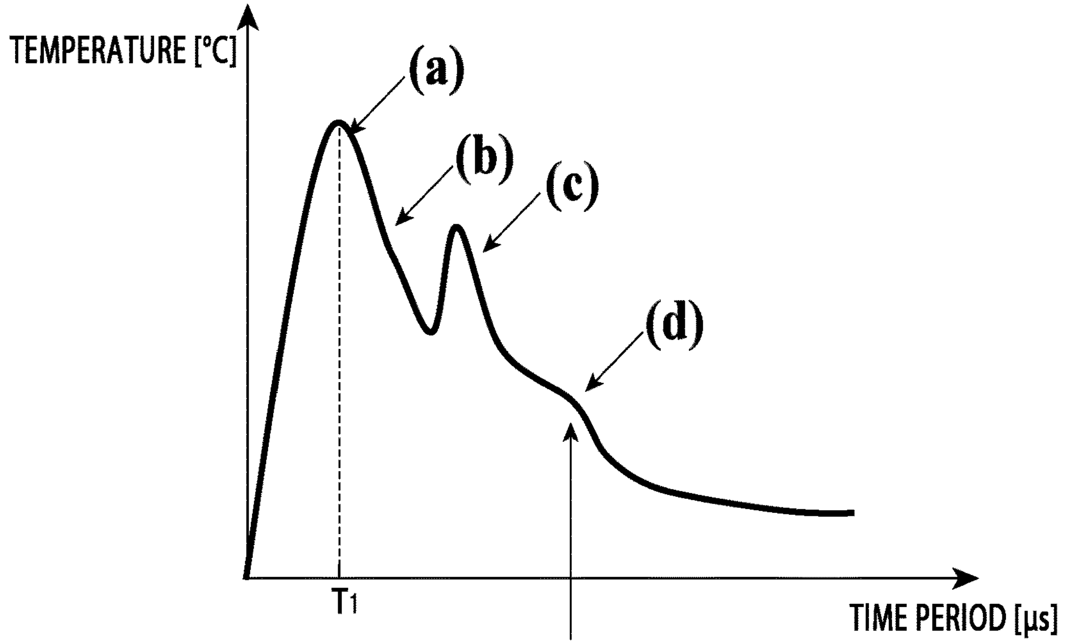
FIG.6E

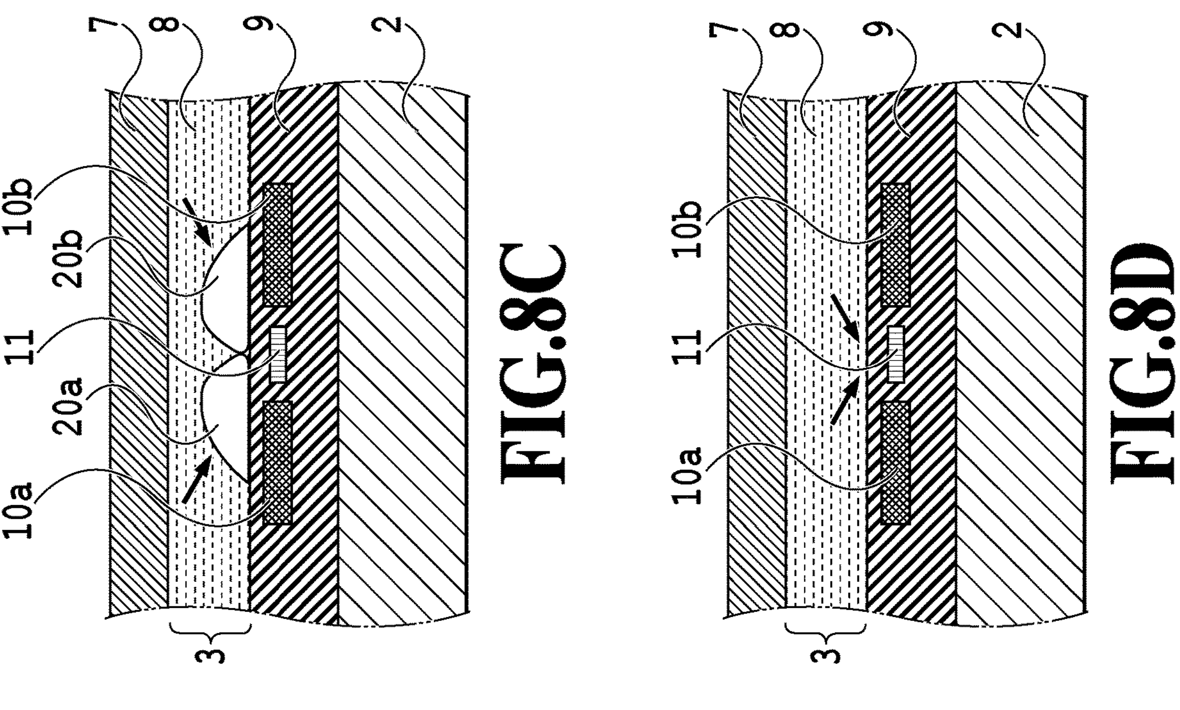
FIG.8C
FIG.8D
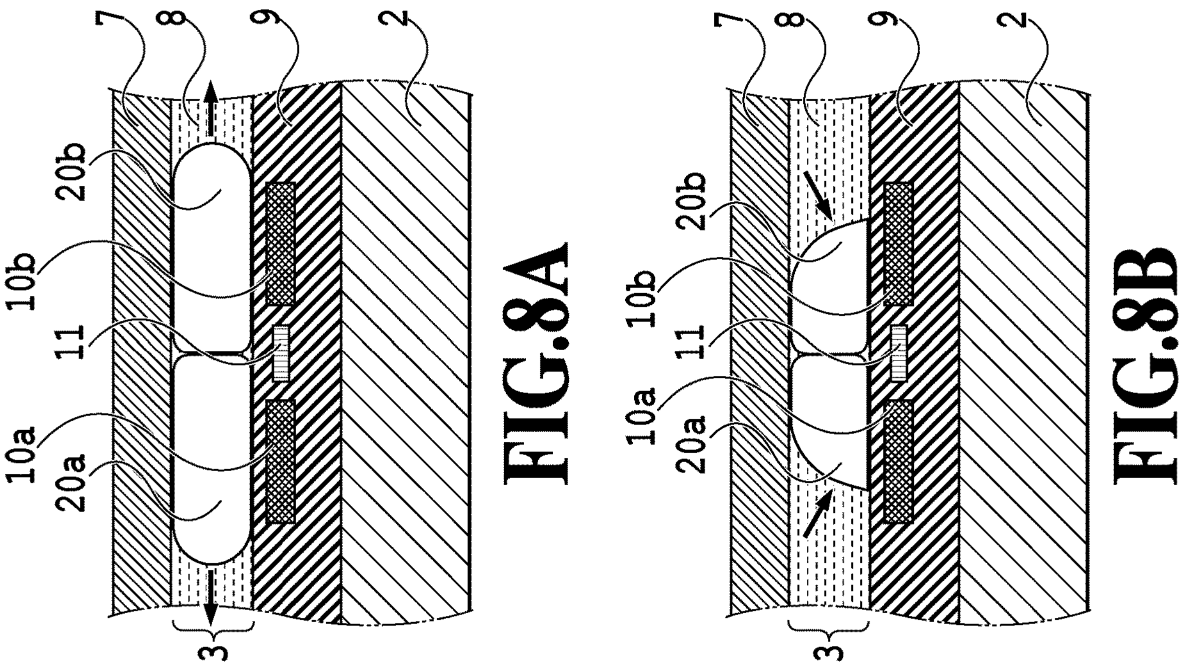
FIG.8A
FIG.8B

LIQUID VISCOSITY MEASUREMENT DEVICE AND LIQUID VISCOSITY MEASUREMENT METHOD

CROSS-REFERENCE TO RELATED APPLICATIONS

This application is a Continuation of International Patent Application No. PCT/JP2022/001651, filed Jan. 18, 2022, which claims the benefit of Japanese Patent Application No. 2021-072425, filed Apr. 22, 2021, both of which are hereby incorporated by reference herein in their entirety.

BACKGROUND OF THE INVENTION

Field of the Invention

The present disclosure relates to a technology for measuring the viscosity of liquid in a channel.

Background Art

A tiny channel through which liquid flows, which is referred to as a microchannel, is known. Patent Literature 1 discloses a method of determining the viscosity of a liquid by generating a bubble in the liquid with a heater and detecting the acoustic signals generated at the timings where the bubble is generated and disappears.

CITATION LIST

Patent Literature

[Patent Literature 1] Japanese Patent Laid-Open No. H09-201967

SUMMARY OF INVENTION

The method described in Patent Literature 1 uses an electroacoustic transducer for detecting the acoustic signals, which may increase the size of the device.

SUMMARY OF THE INVENTION

The liquid viscosity measurement device according to an aspect of the present disclosure is a liquid viscosity measurement device for measuring a viscosity of a liquid including: a substrate; a channel configured to be installed on the substrate so that the liquid flows through the channel; a heating element configured to generate a bubble in the liquid inside the channel; a sensor configured to be placed in a vicinity of the heating element so as to measure a temperature; and a deriving unit configured to derive the viscosity of the liquid by specifying a bubble disappearance time period from generation to disappearance of the bubble based on a change in temperature obtained by use of the sensor, so that the viscosity of the liquid is derived based on the bubble disappearance time period.

Further features of the present invention will become apparent from the following description of exemplary embodiments with reference to the attached drawings.

BRIEF DESCRIPTION OF THE DRAWINGS

FIG. 3A to FIG. 3E are diagrams for explaining a method of driving the liquid viscosity measurement device;

FIG. 6A to FIG. 6E are diagrams for explaining a method of driving the liquid viscosity measurement device;

FIG. 8A to FIG. 8D are diagrams for explaining a method of driving a liquid viscosity measurement device;

FIG. 13A to FIG. 13I are diagrams for explaining a method of driving the liquid viscosity measurement device.

DESCRIPTION OF THE EMBODIMENTS

Hereinafter, a detailed explanation is given of preferable embodiments of the present disclosure with reference to the accompanying drawings. Not that the following embodiments are not intended to limit the contents of the present disclosure, and every combination of the characteristics explained in the present embodiments is not necessarily essential to the solution in the present disclosure.

First Embodiment

<<Configuration of a Liquid Viscosity Measurement Device>>

Figure 1:
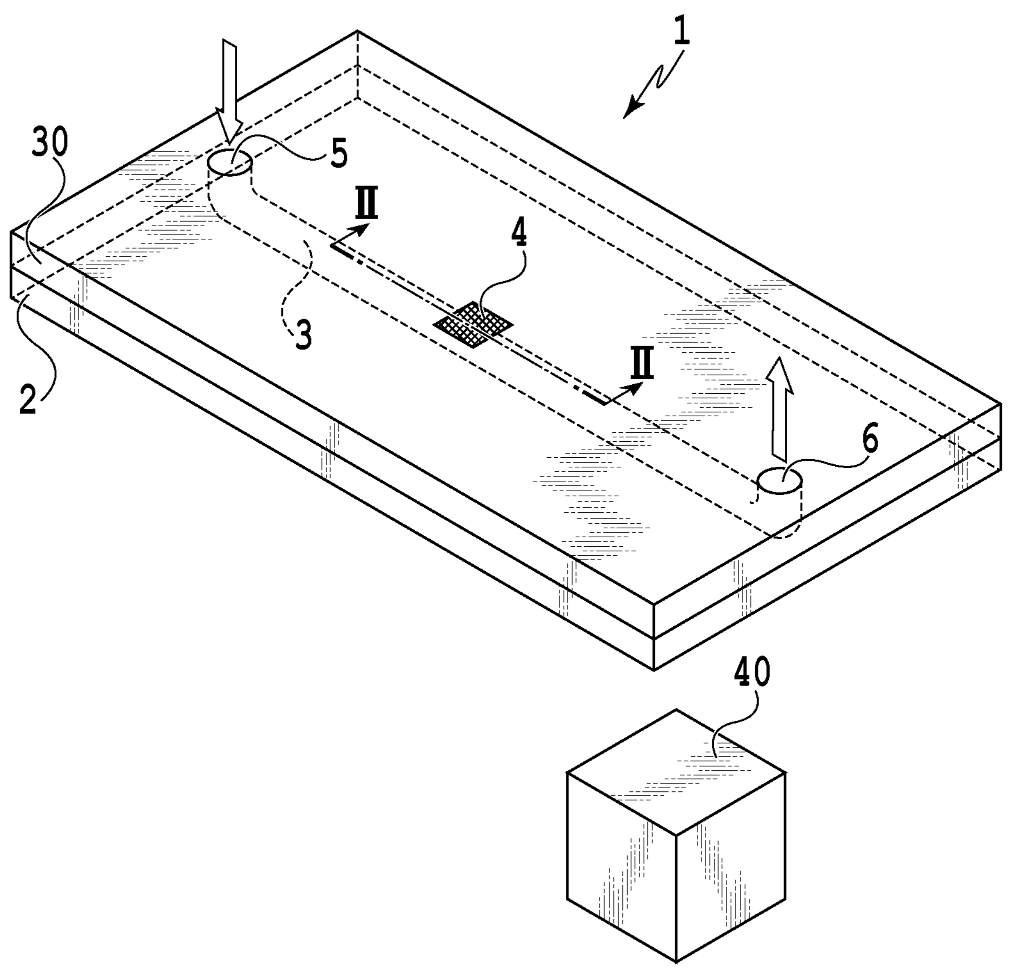
FIG. 1 is a schematic diagram illustrating the configuration of a liquid viscosity measurement device.

FIG. 1 is a schematic view diagram illustrating the configuration of the liquid viscosity measurement device 1 in the present embodiment. The liquid viscosity measurement device 1 of the present embodiment includes the substrate 2. The channel forming member 30 is integrated on the substrate 2. In the channel forming member 30 on the substrate 2, the channel 3, the inlet port 5 of liquid, and the outlet port 6 of the liquid are formed. Further, the measurement unit 4 is installed at a part of the channel 3 on the substrate 2.

The liquid viscosity measurement device 1 of the present embodiment can measure the viscosities of various kinds of liquids. As an example, the liquid viscosity measurement device 1 is used for measuring the viscosity of a liquid (for example, ink) used in an inkjet-type liquid ejection apparatus. Some liquid ejecting apparatuses of this type circulate liquid within the apparatus or within an ejection head. In this case, the water content of the liquid may evaporate and the liquid may thicken depending on the circulation time period. Diluents (for example, water) or the like may be added in a case where the viscosity of the liquid reaches a predetermined value. The liquid viscosity measurement device 1 is used for measuring the viscosity of such liquids. In the case of the above-described example, the liquid viscosity measurement device 1 is installed at a given position within a circulation path. Note that this example is merely an example, and the liquid viscosity measurement device 1 of the present embodiment can be used in general apparatuses that measure the viscosity of liquids. For example, an application to an apparatus that is not equipped with circulation paths is also possible. Further, the liquid viscosity measurement device 1 may be incorporated in various kinds of apparatuses other than a liquid ejection apparatus or may be used alone.

The liquid viscosity measurement device 1 includes the control unit 40. The control unit 40 includes an MPU, a ROM, a RAM, and an interface (I/F), for example. The MPU performs various kinds of processes according to programs and data stored in the ROM while using the RAM as a work area. The various kinds of processes include the process of deriving (measuring) the viscosity of liquid, which is described hereinafter. Further, the MPU outputs various kinds of control signals to the measurement unit 4 via the I/F, obtains the data measured by the measurement unit 4, etc. Note that, in the example of FIG. 1, although the example in which the liquid viscosity measurement device 1 includes the control unit 40 has been explained, it is also possible that the process of deriving the viscosity of liquid is performed based on control from a control unit of an external apparatus. For example, the process of deriving the viscosity of liquid may be performed based on control from a control unit of a liquid ejection apparatus in which a liquid viscosity measurement device is incorporated.

Figure 2:
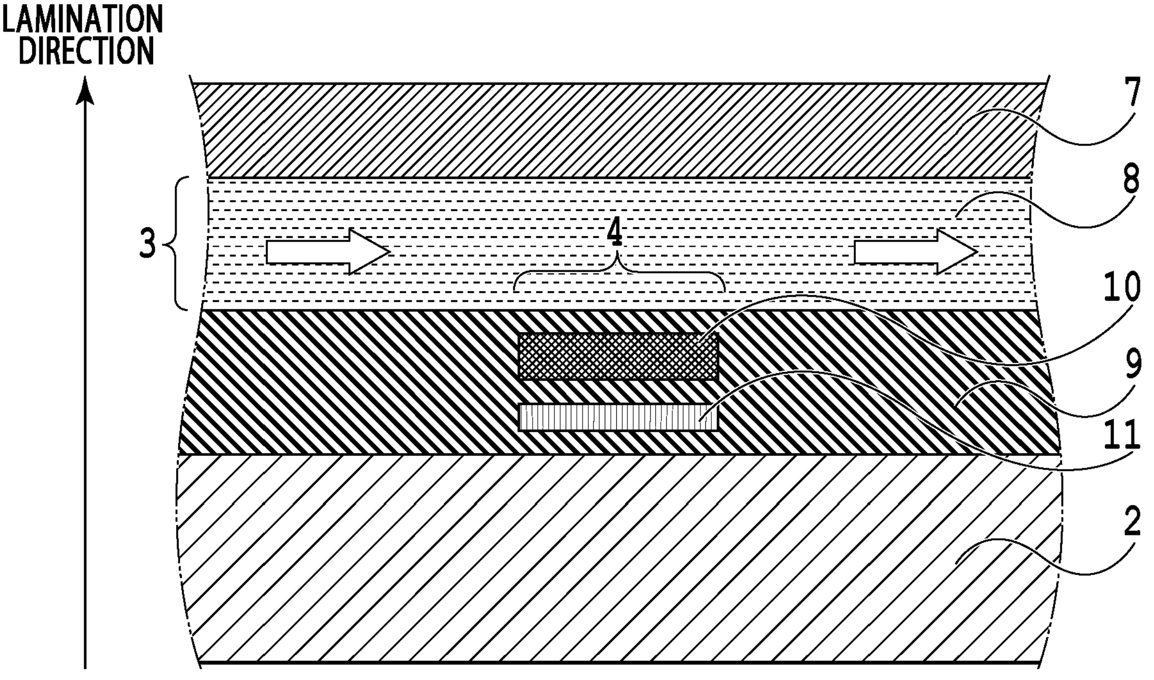
FIG. 2 is an enlarged cross-sectional view diagram of the vicinity of a measurement unit.

FIG. 2 is an enlarged cross-sectional view diagram of the vicinity of the measurement unit 4. FIG. 2 is a cross-sectional view diagram taken along line II of FIG. 1. The heater 10 and the temperature sensor 11, which correspond to the measurement unit 4, are formed on the substrate 2 in a laminated manner. In the example of FIG. 2, the heater 10 is formed closer to the channel 3 than the temperature sensor 11 is. Further, the insulating layer 9 is laminated on the substrate 2. The configuration including the insulating layer 9 may be referred to as a substrate in a broad sense. Note that, although it appears that FIG. 2 schematically shows the heater 10 and the temperature sensor 11 embedded inside the insulating layer 9, in practice, the insulating layer 9 is formed by using a general semiconductor process to laminate multiple insulating films. That is, a part of the insulating layer 9 is laminated on the substrate 2, and the temperature sensor 11 is formed in the lamination direction (the direction from the substrate 2 toward the channel 3), and further, via the insulating layer 9, the heater 10 is formed in the lamination direction. That is, the heater 10 and the temperature sensor 11 are installed on the substrate 2. Further, wiring and the like (not illustrated in the drawings) for energizing the heater 10 and the temperature sensor 11 are installed on the substrate 2. The channel 3 is formed between the insulating layer 9 on the substrate 2 and the channel wall 7 formed by the channel forming member 30. The liquid 8 flows through the channel 3.

A differential pressure is applied between the inlet port 5 and the outlet port 6 (see FIG. 1) so that the liquid 8 flows through the channel 3 in the configuration. An explanation is given of an example of dimensions and values of each part. The cross-section area of the channel 3 is 30 micrometers wide and 30 micrometers high, for example. The distance between the inlet port 5 and the outlet port 6 (the length of the channel 3) is 5 millimeters, for example. A differential pressure of about 3 kilopascals is applied between the inlet port 5 and the outlet port 6. Here, in a case where the viscosity of the liquid 8 is about 1 cP (centipoise) or more and 10 cP or less, the flow velocity of the liquid 8 flowing through the channel 3 is about 2 mm/sec or more and 20 mm or less.

The heater 10 has a square shape with each side of 20 micrometers and is an energy generating element (heating element) using a thin film of tantalum silicon nitride (TaSiN) or tantalum nitride (TaN), for example. The temperature sensor 11 has a square shape with each side of 20 micrometers and is a thin film resistive temperature sensor that utilizes a thin film of TaSiN or TaN, for example. The temperature sensor 11 may have a snake shape or the like in order to increase electric resistance with a small area. The temperature sensor 11 is placed in the vicinity of the heater 10. In the present embodiment, the temperature sensor 11 is placed below the heater 10 in the lamination direction. The temperature sensor 11 of the present embodiment measures the temperature of the substrate 2. In the present embodiment, the heater 10 is placed in the lamination direction of the temperature sensor 11 within the insulating layer 9 in the substrate 2, and thus the temperature measured by the temperature sensor 11 is equivalent to the temperature of the heater 10. The insulating layer 9 is formed using a thin film such as a silicon oxide film ($SiO_2$ film) or a silicon nitride film (SiN film). The channel wall 7 may be formed of a resin material such as photoresist or may be formed of an inorganic material such as a silicon substrate. Note that the above-described examples of dimensions are merely examples, and there is not a limitation as such. Further, although the dimensions of the heater 10 and the temperature sensor 11 are the same size in the example of FIG. 2, there is not a limitation as such. The size of the heater 10 may be larger or smaller than the size of the temperature sensor 11. Further, although the example of FIG. 2 shows a diagram in which only the insulating layer 9 is formed on the substrate 2, other layers may be formed.

Note that, as described above, the temperature sensor 11 is a thin film resistive temperature sensor. Temperature measurement using the temperature sensor 11 can be performed by measuring the resistance value of the temperature sensor 11 with a resistance value measurement unit, which is connected to the temperature sensor 11, and converting this into temperature information. As long as the resistance value measurement unit is installed in the liquid viscosity measurement device 1, the resistance value measurement unit may be installed at a different position from the temperature sensor 11 installed on the substrate 2 (the insulating layer 9).

<Explanation of a Method of Driving the Liquid Viscosity Measurement Device>

FIG. 3A to FIG. 3E are diagrams for explaining a method of driving the liquid viscosity measurement device 1. FIG. 3A to FIG. 3D are schematic diagrams in chronological order of how the bubble 20 is generated by use of the heater 10. FIG. 3E is a graph in which time period is indicated on the horizontal axis and temperature detected by the temperature sensor 11 is indicated on the vertical axis. In FIG. 3E, (a) to (d) indicate the times and temperatures in the respective states of FIG. 3A to FIG. 3D.

The liquid viscosity measurement device 1 applies an electric pulse to the heater so as to heat the liquid 8 being in contact with the heater 10 and generate the bubble by film boiling. The electric pulse applied to the heater is, for example, a voltage of V or more and 30 V or less with a pulse width of about 0.1 microsecond or more and 2 microseconds or less. The timing at which the electric pulse is applied is shown as the bubble generation time $T_1$. The generated bubble 20 grows as shown in FIG. 3A. The bubble 20 grown as shown in FIG. 3A then shrinks as shown in FIG. 3B. At such a time, the temperature detected by the temperature sensor 11 shifts as shown in FIG. 3E. That is, after hitting the maximum reaching temperature with the heat generated by the heater 10 at the time of the bubble generation, the temperature drops. Furthermore, as the bubble 20 shrinks as shown in FIG. 3C, the temperature further drops. The temperature drop here is caused by diffusion of the heat generated by the heater 10 to the substrate side. The bubble 20 further shrinks and then disappears (bubble disappearance) as shown in FIG. 3D. At such a time, the heater 10 comes into contact with the liquid 8, and thus the temperature drops rapidly. Therefore, the temperature measured by the temperature sensor 11 also drops rapidly. This rapid drop in temperature, that is, the inflection point in the temperature drop phase, is the timing of the bubble disappearance (the bubble disappearance time $T_2$) shown in FIG. 3E.

If the bubble generation time $T_1$ and the bubble disappearance time $T_2$ can be specified, the bubble disappearance time period can be obtained by subtracting the bubble generation time $T_1$ from the bubble disappearance time $T_2$. Further, the liquid viscosity measurement device 1 derives the viscosity of the liquid 8 using a table or a relational expression representing the relationship between viscosity of the liquid 8 and bubble disappearance time period obtained in advance.

Figure 4:
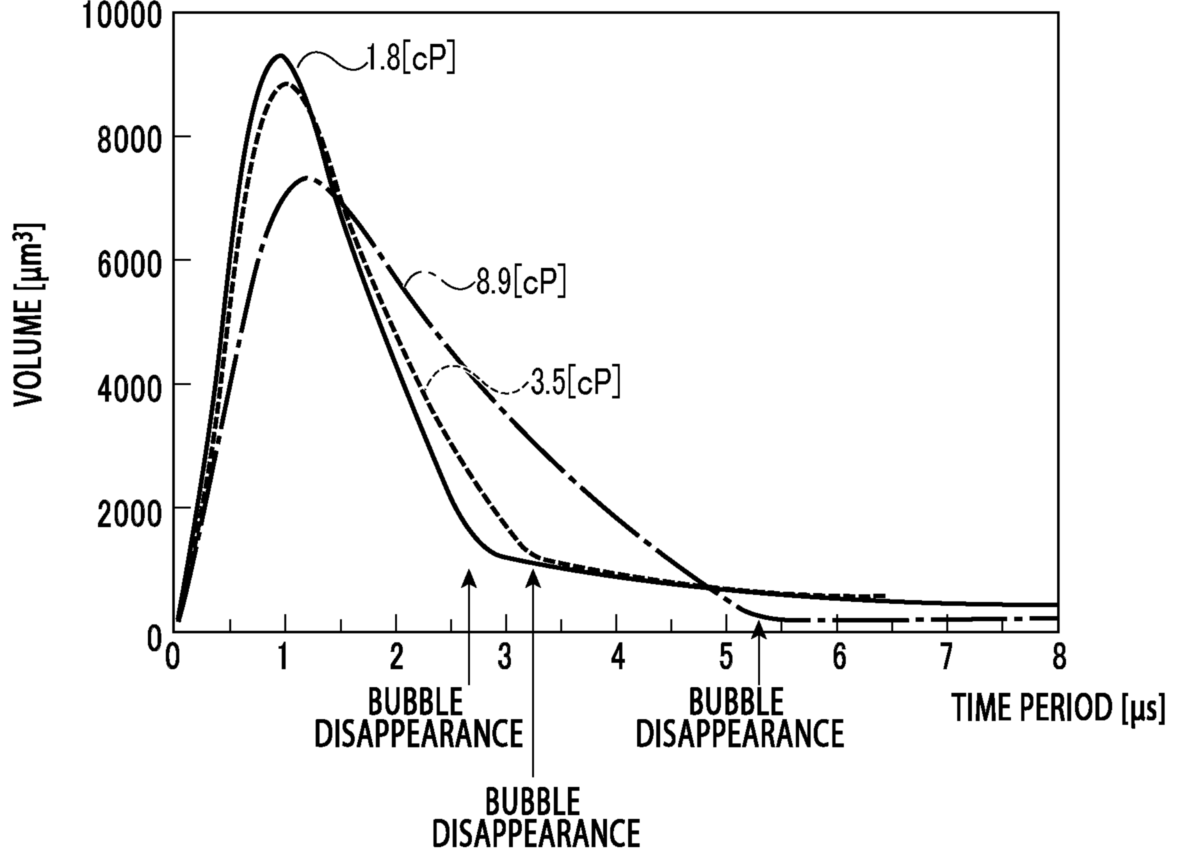
FIG. 4 is a graph showing calculated time periods from the generation of bubbles to the disappearance of the bubbles in liquids.

FIG. 4 is a graph obtained by simulation. FIG. 4 is a graph showing the calculated time periods from the generation of bubbles to the disappearance of the bubbles in three types of liquids with different viscosities. The vertical axis in FIG. 4 corresponds to volumes of the bubbles, and the horizontal axis corresponds to time periods. The timing at which a volume becomes zero corresponds to bubble disappearance. Although the volumes of the bubbles do not become completely zero as obtained by simulation, the inflection points in the volume drops (the times denoted as "bubble disappearance" in the drawing) can be regarded as bubble disappearance. As illustrated in FIG. 4, the higher the viscosity is, the longer (slower) the bubble disappearance time period is. Note that the method of obtaining the relationship between viscosity and bubble disappearance time period is not limited to simulation, and the relationship may be obtained by experiments using an actual device or the like.

Figure 5:
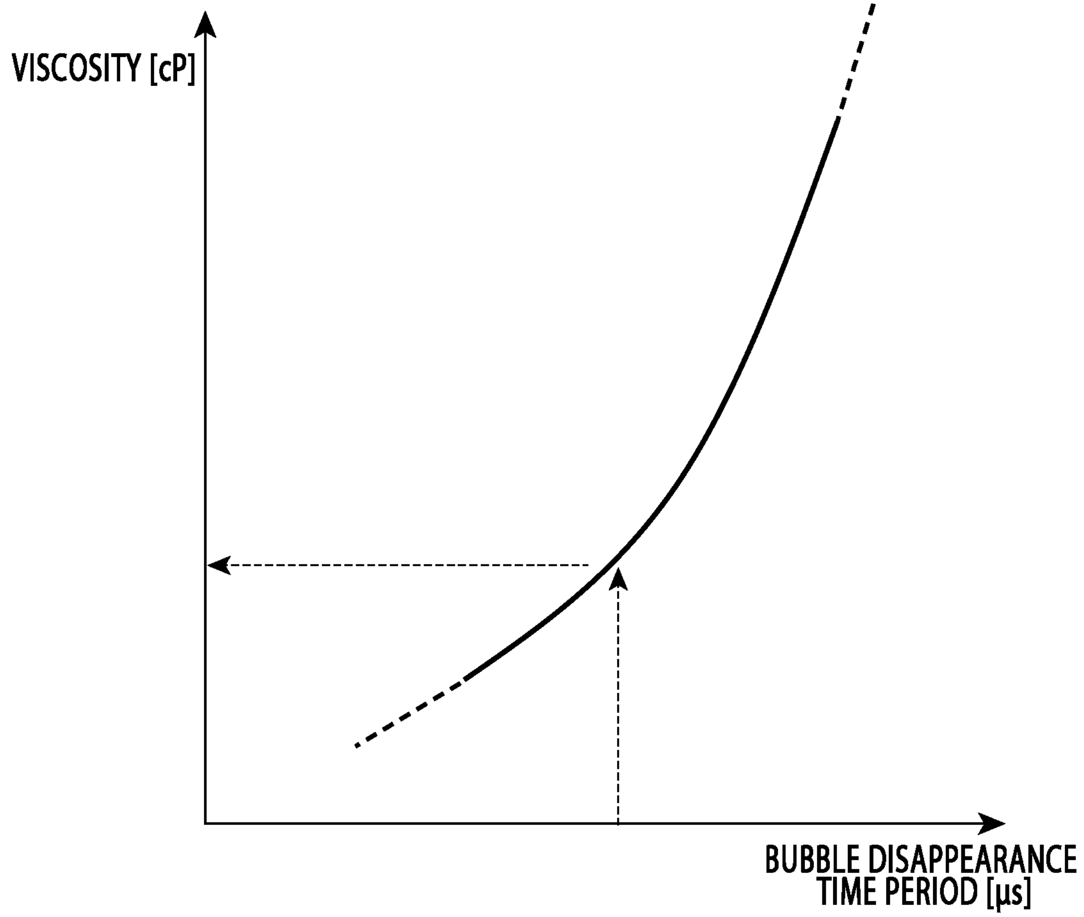
FIG. 5 is a graph schematically illustrating the relationship between viscosity and bubble disappearance time period.

FIG. 5 is a graph schematically illustrating the relationship between viscosity and bubble disappearance time period. The horizontal axis of FIG. 5 corresponds to bubble disappearance time period, and the vertical axis corresponds to viscosity. That is, if the bubble disappearance time period can be specified, the viscosity of the liquid 8 can be derived.

Table 1 is an example of a conversion table showing a relationship in which the viscosities and bubble disappearance time periods are associated with each other.

TABLE 1

| Viscosity (cP) | Bubble Disappearance Time Period (μs) |
|---|---|
| 1.8 | 2.7 |
| 3.5 | 3.3 |
| 8.9 | 5.3 |

Formula 1 is an example of a relational expression representing the relationship between viscosity and bubble disappearance time period.

$$v=f(t) \quad \text{Formula (1)}$$

Here, v corresponds to viscosity and t corresponds to bubble disappearance time period.

In this way, with specification of the bubble disappearance time period, the viscosity of the liquid 8 can be obtained by referring to such a conversion table as Table 1 or can be derived by calculation according to Formula (1), for example. Note that, although the example in which the bubble disappearance time period is longer with higher viscosity is explained here, limitation to this example is not intended. For example, depending on the type and properties of the liquid used or the shape or dimensions of the channel or heater, the relationship between viscosity and bubble disappearance time period may be reversed, such that the bubble disappearance time period becomes longer with lower viscosity. In such a case, obtaining the relationship between viscosity and bubble disappearance time period for a liquid of the same type with a known viscosity in advance would suffice, and the viscosity may be derived from the bubble disappearance time period according to the conversion table or relational expression obtained as such. Note that such a conversion table shown in Table 1 and various parameters in Formula (1) are assumed to be stored in the ROM or RAM of the control unit 40, etc.

Note that, depending on the viscosity of the liquid or the shape or dimensions of the channel or heater, it may take 10 microseconds (μs) or more for a generated bubble to disappear. In this case, detection of the inflection point at the time of the bubble disappearance may be difficult since the temperature indicated by the temperature sensor 11 has already dropped considerably at the time of the bubble disappearance.

FIG. 6A to FIG. 6E are diagrams for explaining a method of driving the liquid viscosity measurement device 1 in such a case where the bubble disappearance time period exceeds a predetermined time period (for example, 10 μs). FIG. 6A to FIG. 6D are schematic diagrams in chronological order of how the bubble 20 is generated by use of the heater 10, as with FIG. 3A to FIG. 3D. FIG. 6E is a graph in which time period is indicated on the horizontal axis and temperature detected by the temperature sensor 11 is indicated on the vertical axis. In FIG. 6E, (a) to (d) indicate the times and temperatures in the respective states of FIG. 6A to FIG. 6D.

In the example of FIG. 6A to FIG. 6E, it is assumed that it is known in advance that the bubble disappearance time period of the bubble 20 will exceed a predetermined time period. In this case, the electric pulse is applied to the heater 10 again in the state before the bubble 20 disappears around the time of FIG. 6C. Accordingly, the temperature measured by the temperature sensor 11 is raised. Note that the electric pulse applied to the heater 10 for raising the temperature is an electric pulse that does not cause bubble generation in the liquid 8. This is because, if the bubble 20 grows again or a new bubble 20 is generated, there will be an effect on the bubble disappearance time period. As shown in FIG. 6E, around the time of (c), how the temperature measured by the temperature sensor 11 is raised as the electric pulse is applied to the heater 10 again is illustrated. By raising the temperature again in this way, the inflection point in the temperature drop phase that appears at the time of bubble disappearance can be detected more clearly. That is, in the present embodiment, the temperature sensor 11 performs measurement to detect an inflection point, and thus the temperature measured by the temperature sensor 11 may vary irregularly at points in time after bubble generation and before bubble disappearance.

Note that the movement speed of the liquid (liquid surface) from bubble generation to bubble disappearance is 1 msec or more and 2 msec or less. This movement speed is about 50 times to 1000 times faster than the flow speed of the liquid 8 (2 mm/sec or more and 20 mm/sec or less) which occurs along with the differential pressure applied between the inlet port 5 and the outlet port 6 as described above. For this reason, from the viewpoint of the liquid surface movement speed from bubble generation to bubble disappearance, the flow velocity caused by the differential pressure is virtually stopped. That is, the liquid flow caused by the differential pressure may be treated as having no effect on the inflection point in the temperature drop phase.

Further, in the present embodiment, although the case where the liquid 8 moves due to the differential pressure between the inlet port 5 and the outlet port 6 has been explained as an example, the liquid 8 may move and may not move in the channel 3. The flow of the liquid 8 may be controlled such that the flow of the liquid 8 is stopped in a case of measuring the viscosity of the liquid 8 and is started after the measurement. Preferably, as explained in the present embodiment, the flow of the liquid 8 is generated at a speed sufficiently slower than the movement speed of the liquid from bubble generation to bubble disappearance. By performing control in this way, even if foreign substances, bubbles, or the like enter the channel 3, they can be quickly discharged, so as to suppress an effect on the measurement.

Further, in the example explained in the present embodiment, as illustrated in FIG. 2, etc., the channel wall 7 is installed on the surface facing the heater 10. That is, ejection ports (holes through which liquid is ejected to the outside), such as those installed in what is termed as an inkjet head, are not formed. This is because, if ejection ports are not formed, the difference in bubble disappearance time period which occurs in accordance with the difference in viscosity tends to occur more clearly. Note that, even though ejection ports are formed on the surface facing the heater 10, the difference in bubble disappearance time period which occurs in accordance with the difference in viscosity occurs to some extent although it does not occur as clearly as in the case where ejection ports are not formed. For this reason, although it is possible that ejection ports are formed on the surface facing the heater 10, it is preferable that no ejection port is formed. Further, for the same reason, it is preferable that the channel wall 7 extends to the range where the pressure wave which occurs along with the bubble 20 generated by the heater 10 reaches. That is, it is preferable that ejection ports of neither what is termed as an edge shooter system, in which the shape from an ink channel to the ejection ports is linear, nor what is termed as a side shooter system, in which the direction of an ink channel and the direction of the ejection ports are different, are not formed.

Further, in the present embodiment, although it is assumed in the explanation of the example of the cross section of the channel 3 that the width is 30 micrometers and the height is 30 micrometers, needless to say, other dimensions are also possible. For example, if the height of the channel 3 is lower than a predetermined value (for example, 30 micrometers), the bubble disappearance time period which occurs along with the difference in viscosity tends to vary more significantly. Therefore, it is possible to increase the sensitivity of detecting the inflection point in a temperature drop phase. However, even in a case where the height of the channel 3 is higher than the above-described predetermined value, it is possible to detect the inflection point in a temperature drop phase.

Further, in the present embodiment, although the explanation has been given of the example to be used for measuring the viscosity of a liquid (for example, ink) used in an inkjet-type liquid ejection apparatus, limitation to this example is not intended. Such a technology of a microchannel as explained in the present embodiment can be utilized in various fields such as inkjet printers, bioresearch, or chemical engineering. By measuring the viscosity of the liquid flowing through such a microchannel and appropriately controlling the viscosity of the liquid, the performance in application can be maintained.

As explained above, in the liquid viscosity measurement device 1 according to the present embodiment, energy is applied to the heater 10, which is an energy generating element installed on the substrate 2, so as to thereby generate the bubble 20 in the liquid 8 inside the channel 3 formed on the substrate 2. Further, the bubble disappearance time period of the bubble 20 is specified by measuring the temperature change using the temperature sensor 11 installed on the substrate. The viscosity of the liquid 8 is derived (measured) based on the bubble disappearance time period specified in this way. As described above, in the liquid viscosity measurement device 1 of the present embodiment, a sensor for measuring the viscosity is integrated in a channel, and thus the downsizing of the device can be achieved. That is, it is possible to provide a liquid viscosity measurement device for which an increase in size can be suppressed. Further, since no current is applied to the liquid at the time of measuring the viscosity, the viscosity of the liquid in the channel can be measured without changing the characteristics of the liquid.

Second Embodiment

In the first embodiment, the explanation has been given of the example in which the temperature sensor 11 and the heater 10 are laminated on the substrate 2 in the lamination direction. In the present embodiment, an explanation is given of an example in which the temperature sensor 11 and the heater 10 are not installed in the lamination direction.

Figure 7:
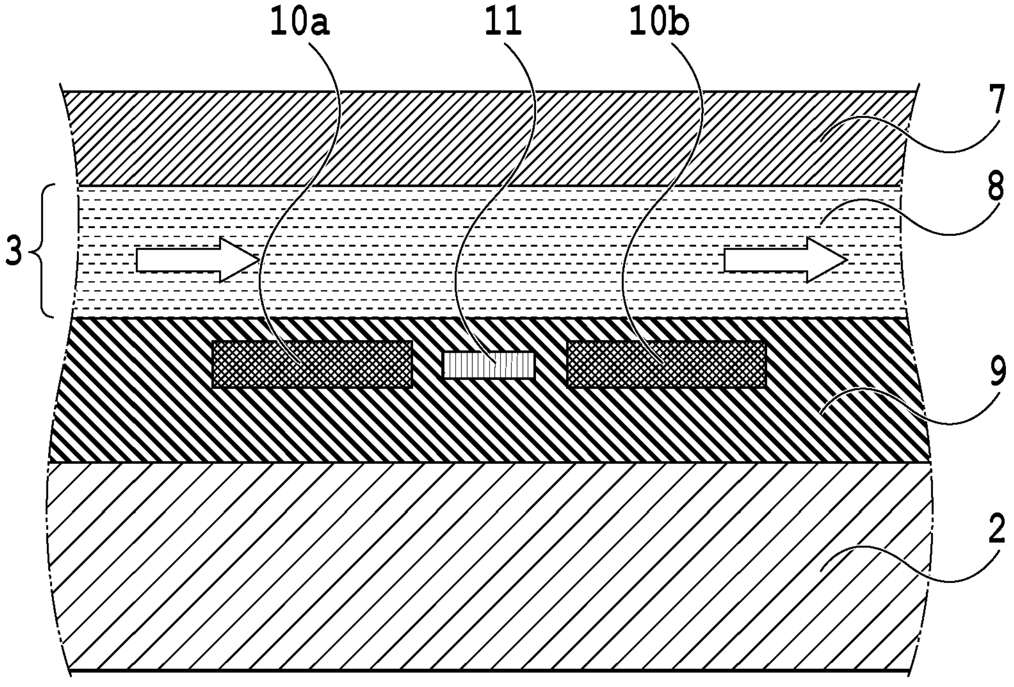
FIG. 7 is an enlarged cross-sectional view diagram of the vicinity of a measurement unit.

FIG. 7 is an enlarged cross-sectional view diagram of the vicinity of the measurement unit 4 in the present embodiment. In the measurement unit 4 of the present embodiment, the heater 10 includes the first heater 10*a* and the second heater 10*b*. Further, the temperature sensor 11 is placed along the extending direction of the channel 3 between the first heater 10*a* and the second heater 10*b*. Note that the gap between the first heater 10*a* and the second heater 10*b* is made as close as possible such as about 5 micrometers.

FIG. 8A to FIG. 8D are diagrams for explaining a method of driving the liquid viscosity measurement device 1. FIG. 8A to FIG. 8D are schematic diagrams in chronological order of how the bubble 20 is generated by use of the heater 10. Electric pulses are applied to both the first heater 10*a* and the second heater 10*b* to simultaneously generate bubbles from both heaters. Then, as illustrated in FIG. 8A, the bubbles 20*a* and 20*b* generated by the respective heaters almost coalesce. Note that, in some cases, a thin skin of the remaining liquid 8 remains in the central part of the coalesced bubbles. Further, as illustrated in FIG. 8B to FIG. 8D, the bubbles gradually become smaller and finally disappear.

According to the present embodiment, by generating bubbles using two heaters, the size of generated bubbles can be increased. Therefore, the difference in bubble disappearance time period, which is caused by the difference in viscosity, can be increased. In the present embodiment, the temperature sensor 11 and the heater 10 (the first heater 10*a* and the second heater 10*b*) are not laminated as in the first embodiment. Therefore, it is possible to reduce an effect of the electric pulses to be imposed on the temperature sensor 11 at the time of generating the bubbles with the heater 10. Further, in the present embodiment, the temperature sensor 11 can be placed at a position closer to the liquid 8 (a position in contact with the liquid 8 via the insulating layer 9), and thus the inflection point in a temperature drop phase that occurs at the time of bubble disappearance can be more clearly detected.

Note that each modification example explained in the first embodiment can similarly be applied to the present embodiment. For example, in a case where the bubble disappearance time period exceeds a predetermined time period (for example, 10 μs), electric pulses may be applied again to the first heater 10*a* and the second heater 10*b* to raise the temperature.

Third Embodiment

In the embodiments so far, the explanation has been given of the examples in which the temperature sensor 11 is placed on the substrate 2. In the present embodiment, an explanation is given of an example in which the temperature sensor 11 is placed on the channel wall 7.

Figure 9:
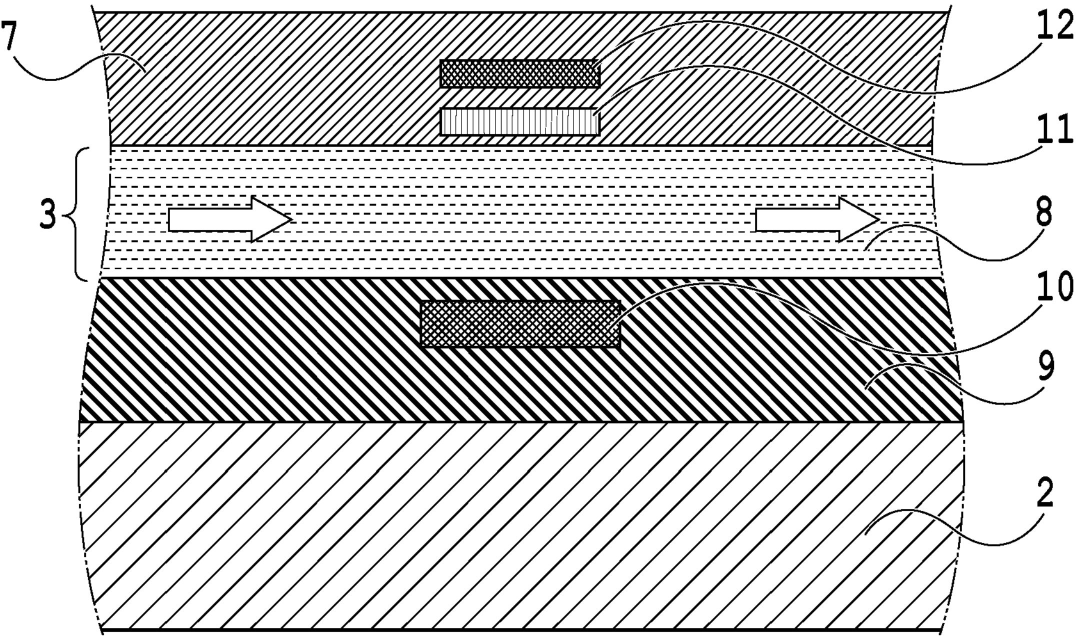
FIG. 9 is an enlarged cross-sectional view diagram of the vicinity of a measurement unit.

FIG. 9 is an enlarged cross-sectional view diagram of the vicinity of the measurement unit 4 in the present embodiment. In the measurement unit 4 of the present embodiment, the temperature sensor 11 is placed at a position inside the channel wall 7 facing the position where the heater 10 is placed. Further, the small heater 12 is placed in the lamination direction of the temperature sensors 11 (that is, on the opposite side of the channel 3). The small heater 12 is used to heat the temperature sensor 11.

Figure 10A:
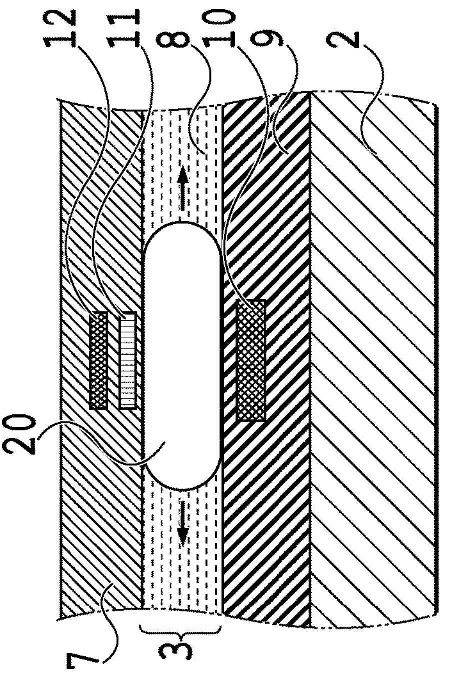
FIG. 10A to FIG. 10D are diagrams for explaining a method of driving a liquid viscosity measurement device.
Figure 10B:
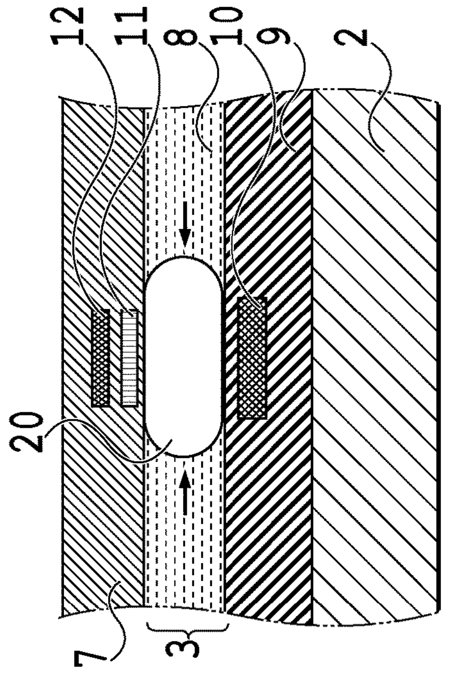
Figure 10C:
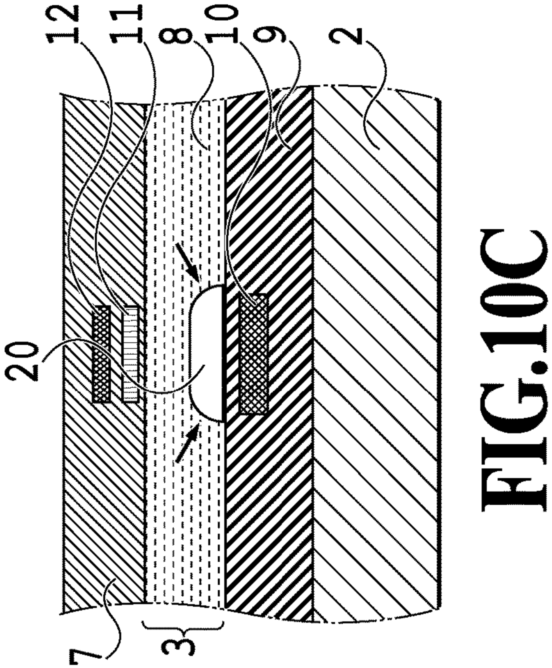
Figure 10D:
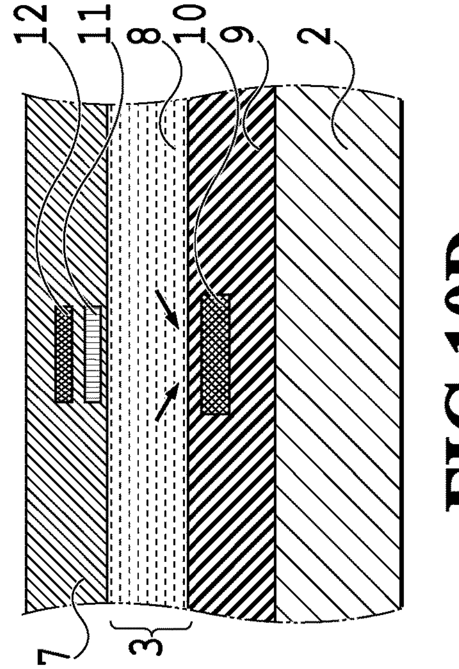

FIG. 10A to FIG. 10D are diagrams for explaining a method of driving the liquid viscosity measurement device 1. FIG. 10A to FIG. 10D are schematic diagrams in chronological order of how the bubble 20 is generated by use of the heater 10. As illustrated in FIG. 10A, an electric pulse is applied to the heater 10 to generate the bubble 20. Further, as illustrated in FIG. 10B to FIG. 10D, the bubble gradually becomes smaller and finally disappears. In the present embodiment, the small heater 12 laminated on the temperature sensor 11 is heated at the timing of FIG. 10A or FIG. 10B. In the first embodiment and the second embodiment, the explanation has been given of the example in which the substrate 2 is heated by the heater 10 and the temperature of the substrate 2 is measured by the temperature sensor 11 to specify the timing of bubble disappearance. On the other hand, in the present embodiment, the temperature sensor 11 is not placed on the substrate 2. Therefore, in the temperature sensor 11, in order to clearly detect the inflection point in a temperature drop phase, the small heater 12 performs the heating at a timing before bubble disappearance so as to increase the temperature of the temperature sensor 11 in conjunction with bubble generation.

Note that the heating performed by the small heater 12 is completely independent from the heater 10, which is for bubble generation, and thus it is also possible to perform the heating in a gradual manner over a long period of time (for example, 2 microseconds or more and 5 microseconds or less) or preform the heating over a short period of time (for example, 0.5 microseconds) in a repeated manner. Further, the small heater 12 does not perform the heating to generate bubbles but performs the heating to increase the temperature of the temperature sensor 11. Therefore, the required current density may be lower than that applied to the heater 10, and thus electrical noise can also be reduced. That is, since a high SN ratio is obtained, the bubble disappearance time period can be obtained more clearly according to the present embodiment.

Note that, in the present embodiment, as shown in FIG. 10C, the inflection point of a temperature drop phase occurs at the point in time where the temperature sensor 11 comes into contact with the liquid 8 via the channel wall 7. Therefore, in the configuration of the present embodiment, although the bubble disappearance time measured by the temperature sensor 11 would indicate a slightly earlier point in time, it is within a margin of error in the measurement of the difference in bubble disappearance time period caused by the difference in viscosity.

Further, although the explanation has been given of the example in which the small heater 12 is placed at a position laminated on the temperature sensor 11 in the channel wall 7 in order to efficiently heat the temperature sensor 11, the small heater 12 may be placed at any position where the temperature sensor 11 can be heated.

Fourth Embodiment

In the first embodiment, the explanation has been given of the example in which one channel with the measurement unit 4 is installed in the liquid viscosity measurement device 1. In the present embodiment, an explanation is given of an example in which multiple channels with measurement units are installed.

Figure 11:
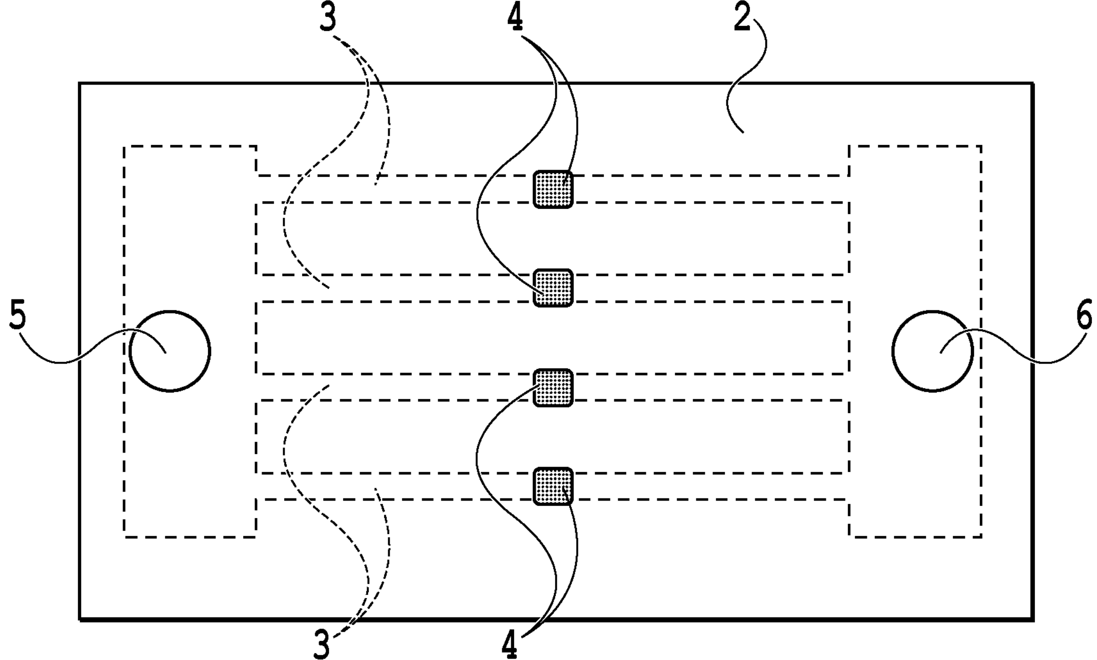
FIG. 11 is a schematic diagram illustrating the configuration of a liquid viscosity measurement device.

FIG. 11 is a schematic diagram view illustrating the configuration of the liquid viscosity measurement device 1 in the present embodiment. In the liquid viscosity measurement device 1 of the present embodiment, the multiple channels 3 and the multiple measurement units 4 are integrated on a substrate 2. That is, the substrate 2 is equipped with the multiple channels 3 with the measurement units 4. Note that there are one inlet port 5 and one outlet port 6 installed.

By repeatedly heating the liquid 8 with the heater 10, thermally altered substances of the components included in the liquid 8 may deposit on the heater 10 (what is termed as kogation), or the heater 10 may be physically damaged by cavitation which occurs along with disappearance of bubbles. In this case, if the multiple channels 3 and measurement units 4 are installed on the substrate 2 as shown in FIG. 11, the viscosity of the liquid 8 can be measured using alternative measurement units. For example, it is possible to perform measurement such that, in a case where the first measurement unit fails to perform a proper measurement, the second measurement unit is used, and, in a case where the second measurement unit fails to perform a proper measurement, the third measurement unit is used. Thereby, viscosity measurement can be continuously performed for a long period of time. Further, since the measurement is performed using multiple measurement units, the reliability of the measurement can be improved.

Figure 12:
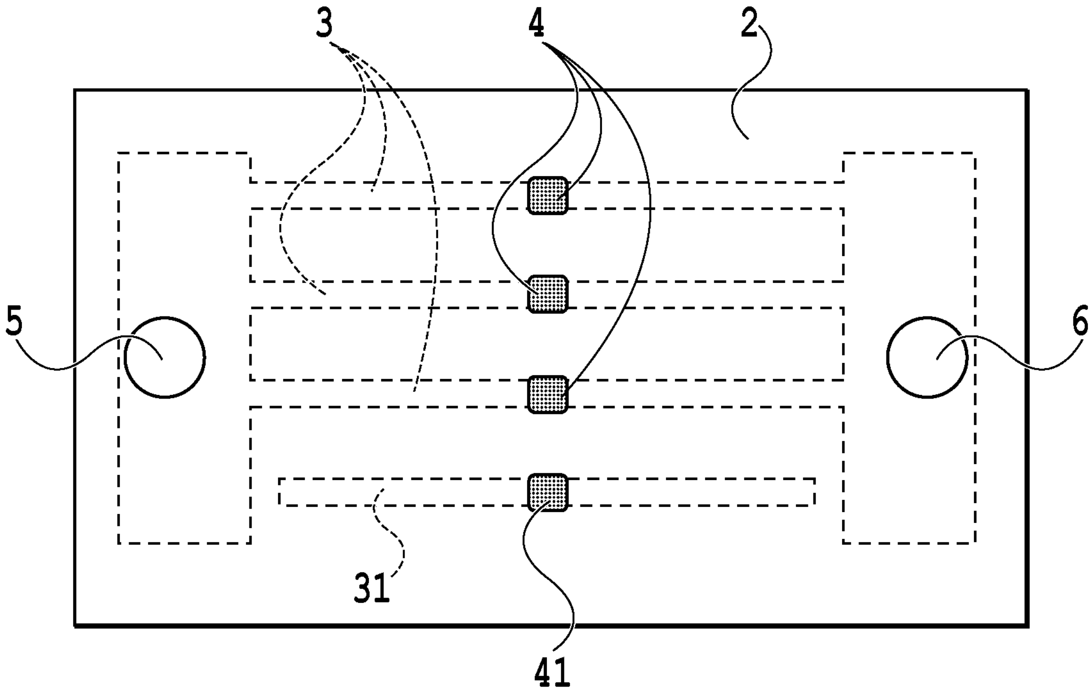
FIG. 12 is a schematic diagram illustrating the configuration of the liquid viscosity measurement device.

FIG. 12 and FIG. 13A to FIG. 13I are diagrams illustrating a modification example of the present embodiment. FIG. 12 is a schematic diagram view illustrating the configuration of the liquid viscosity measurement device 1 in the modification example. As illustrated in FIG. 12, instead of one of the measurement units, there is provided the space 31 that does not communicate with the channel 3 through which the liquid 8 flows, and the isolated reference unit 41 is installed below this space 31. Since the liquid 8 does not flow into the space 31 above the reference unit 41, the heat generated by the heater 10 is always radiated to the substrate 2 side, and thus such an inflection point in a temperature drop phase does not occur. Note that another possible configuration is that the channel leading to the reference unit 41 is closed with a predetermined valve or the like so that the liquid is prevented from flowing to the reference unit 41.

Figures 13A, 13B, 13C, 13D, 13E, 13F, 13G, 13H, 13I:
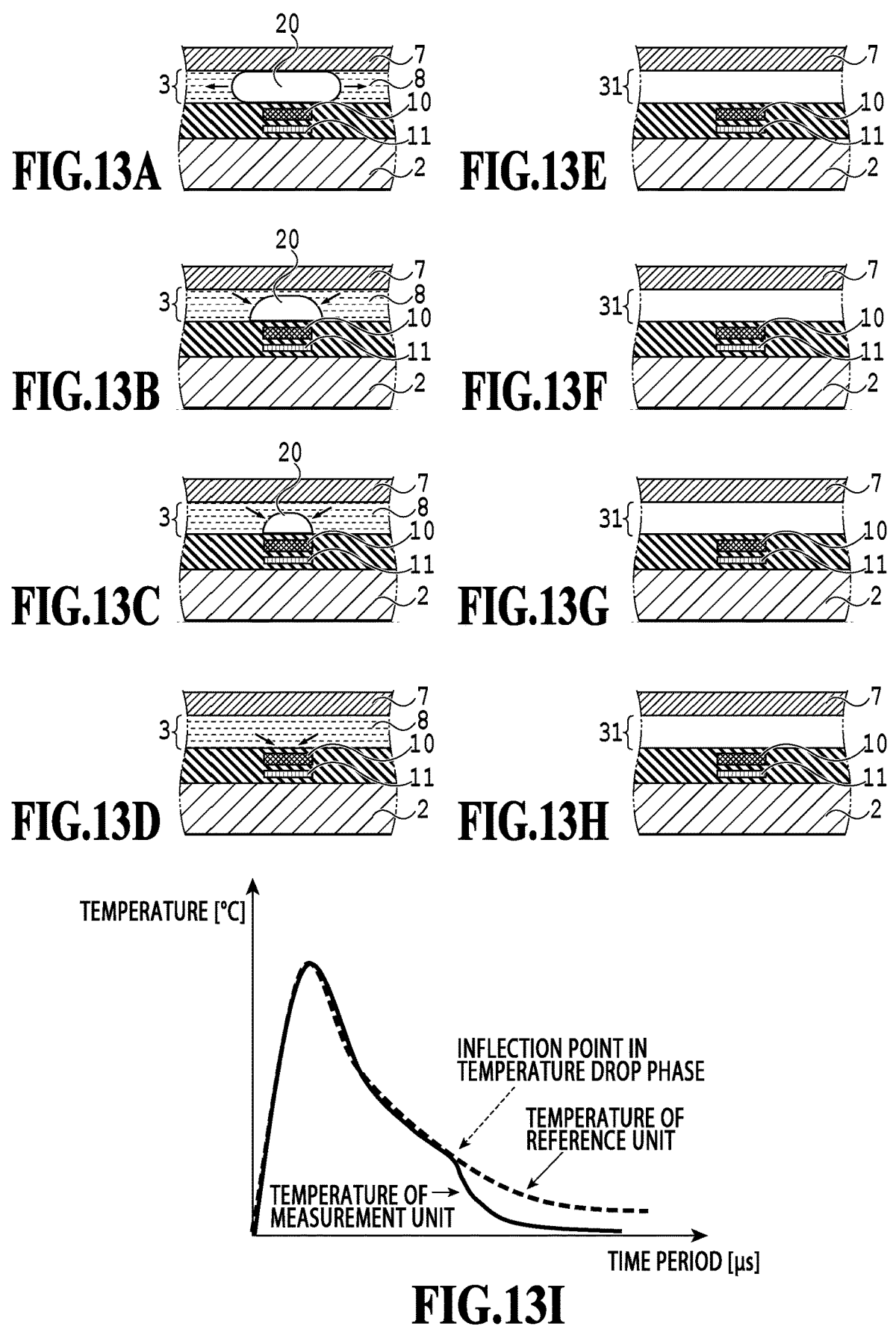

FIG. 13A to FIG. 13I are diagrams for explaining a method of driving the liquid viscosity measurement device 1 of the modification example illustrated in FIG. 12. FIG. 13A to FIG. 13D are schematic diagrams in chronological order of how the bubble 20 is generated by use of the heater 10 in the measurement units 4. FIG. 13E to FIG. 13H are schematic diagrams in chronological order of how heat is generated by use of the heater 10 in the reference unit 41 at the respective timings corresponding to FIG. 13A to FIG. 13D. FIG. 13I is a graph in which time period is indicated on the horizontal axis and temperature detected by the temperature sensor 11 is indicated on the vertical axis. As illustrated in FIG. 13I, although the inflection point of the temperature drop phase occurs in the temperature detected by the measurement units 4, an inflection point of the temperature drop phase does not occur in the temperature detected by the reference unit 41. Therefore, by comparing the temperature profiles of the measurement units 4 and the reference unit 41 as shown in FIG. 13I, the inflection point of the temperature drop phase in the measurement units 4 is clearer. Therefore, the bubble disappearance time period can be obtained with high accuracy, and thus the viscosity of the liquid 8 can be obtained with high accuracy.

Note that, in the present embodiment, all of the multiple measurement units 4 may have the same configuration, or some measurement units may have a different configuration from the other measurement units. For example, the measurement units 4 of the present embodiment may have the same configuration as one of the measurement units explained in any of the first embodiment to the third embodiment, or some may have the same configuration as the measurement unit of another embodiment.

Further, although the explanation has been given of the example in which one measurement unit 4 is installed in one channel 3, it is also possible that multiple measurement units 4 are installed in one channel 3. That is, instead of installing the measurement units 4 in parallel, the measurement units 4 may be installed in series. Even in a case where the measurement units 4 are installed in series, the multiple channels 3 may be installed, or a form equipped with a single channel is also possible. In a case where the measurement units 4 are installed in series, it is preferable that the measurement units 4 in each channel 3 are installed apart from each other so that an effect of bubble generation is not imposed on other measurement units. For example, it is preferable that the distance is three times or more of the radius of the bubble 20. Further, it is preferable that the bubble generation timings deviate from each other. For example, after bubble generation is performed by the first measurement unit, it is preferable that bubble generation is not performed by the second measurement unit by the time of the bubble disappearance. In a case where the measurement units 4 are placed in series, the device can be downsized, compared to a case where the measurement units 4 are placed in parallel. Further, on the other hand, in a case where the measurement units 4 are placed in parallel, residual bubbles do not occur on the upstream side, and thus the viscosity of the liquid can be measured in a state of suppressing the effects of residual bubbles.

Fifth Embodiment

In the first embodiment, the explanation has been given of the example in which the temperature sensor 11 and the heater 10 are laminated on the substrate 2 and the heater 10 is placed close to the channel 3. In the present embodiment, an explanation is given of an example in which the temperature sensor 11 and the heater 10 are laminated on the substrate 2 and the temperature sensor 11 is placed close to the channel 3.

Figure 14:
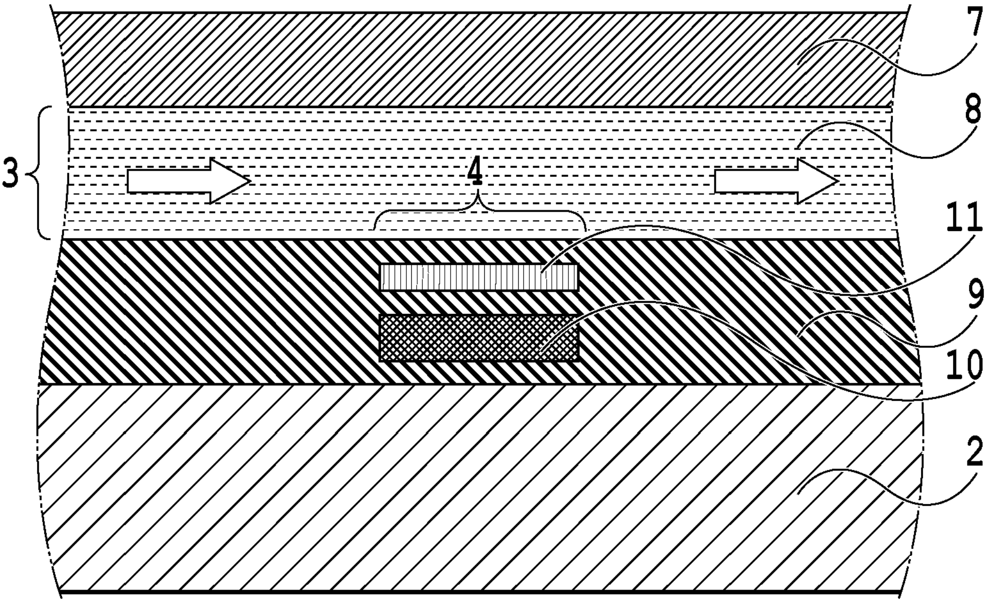
FIG. 14 is an enlarged cross-sectional view diagram of the vicinity of a measurement unit.

FIG. 14 is an enlarged cross-sectional view diagram of the vicinity of the measurement unit 4 in the present embodiment. In the measurement unit 4 of the present embodiment, the heater 10 and the temperature sensor 11 are formed in a laminated manner on the substrate 2. In the example of FIG. 14, the temperature sensor 11 is formed closer to the channel 3 than the heater 10 is. That is, in FIG. 14, unlike the first embodiment, the temperature sensor 11 is placed above (closer to the channel than) the heater 10 in the measurement unit 4. With the temperature sensor 11 placed above the heater 10, the efficiency of transferring heat to the liquid 8 is lowered. Therefore, in the present embodiment, it is necessary to apply more energy to the heater 10 than in the first embodiment. Further, in the present embodiment, the temperature sensor 11 is affected by cavitation at the time of bubble disappearance, and thus the durability of the temperature sensor 11 is poorer. On the other hand, in the present embodiment, the temperature sensor 11 is in contact with the liquid 8 via the insulating layer 9. Therefore, the temperature change at the time of bubble disappearance is greater than in the first embodiment, and thus the inflection point in a temperature drop phase can be detected more clearly. Therefore, the configuration of the present embodiment exhibits its superiority in situations where durability or energy saving property is not required and high sensitivity is required.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. A liquid viscosity measurement device for measuring a viscosity of a liquid, the liquid viscosity measurement device comprising:

a substrate;

a channel configured to be installed on the substrate so that the liquid flows through the channel;

a heating element configured to generate a bubble in the liquid inside the channel;

a sensor configured to be placed in a vicinity of the heating element so as to measure a temperature; and a deriving unit configured to derive the viscosity of the liquid by specifying a bubble disappearance time period from generation to disappearance of the bubble based on a change in temperature obtained by use of the sensor, so that the viscosity of the liquid is derived based on the bubble disappearance time period, wherein the deriving unit is configured to specify the bubble disappearance time period based on a time at which the bubble is generated and a time at which an inflection point occurs in a drop phase which comes after the temperature measured by the sensor rises.

2. The liquid viscosity measurement device according to claim 1, wherein the deriving unit is configured to derive the viscosity of the liquid by referring to a table in which a bubble disappearance time period and a viscosity are associated with each other.

3. The liquid viscosity measurement device according to claim 1, wherein the deriving unit is configured to calculate the viscosity of the liquid by use of a relational equation which represents a relation between a bubble disappearance time period and a viscosity.

4. The liquid viscosity measurement device according to claim 1, further comprising a channel wall on a surface facing the heating element so that the channel is sandwiched between the channel wall and the heating element.

5. The liquid viscosity measurement device according to claim 4, wherein no ejection port for ejecting the liquid is formed in a region of the channel wall that is reached by a pressure wave generated in the liquid upon formation of the bubble.

6. The liquid viscosity measurement device according to claim 4, wherein the sensor is configured to be placed on the channel wall.

7. The liquid viscosity measurement device according to claim 6, wherein, on the channel wall, a second heating element configured to heat the sensor is placed so as to be laminated with the sensor.

8. The liquid viscosity measurement device according to claim 7, wherein a size of the second heating element is configured to be smaller than a side of the heating element configured to generate the bubble.

9. The liquid viscosity measurement device according to claim 1, wherein the sensor is configured to be placed on the substrate.

10. The liquid viscosity measurement device according to claim 9, wherein, on the substrate, the heating element is configured to be laminated closer to the channel than is the sensor.

11. The liquid viscosity measurement device according to claim 9, wherein, on the substrate, the sensor is configured to be laminated closer to the channel than is the heating element.

12. The liquid viscosity measurement device according to claim 9, wherein the sensor is configured to be placed between a plurality of heating elements along the channel.

13. The liquid viscosity measurement device according to claim 12, wherein the plurality of heating elements is configured to generate bubbles simultaneously.

14. The liquid viscosity measurement device according to claim 1, wherein the heating element is configured to generate energy in a range in which the bubble is not generated at a timing before the bubble disappears.

15. The liquid viscosity measurement device according to claim 1, wherein, on the substrate, a plurality of channels equipped with the heating element and the sensor is configured to be installed.

16. The liquid viscosity measurement device according to claim 15, wherein at least one of the plurality of channels is configured so as not to allow the liquid to flow, and wherein the deriving unit is configured to derive the viscosity by use of a sensor that is placed in the channel through which the liquid does not flow and a sensor that is placed in a channel through which the liquid flows.

* * * * *